United States Patent
Pachore

(10) Patent No.: US 9,963,028 B1
(45) Date of Patent: May 8, 2018

(54) BATTERY SUPPORT STRUCTURE FOR ELECTRIFIED VEHICLE

(71) Applicant: Ford Global Technologies, LLC, Dearborn, MI (US)

(72) Inventor: Vijay Pachore, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/437,539

(22) Filed: Feb. 21, 2017

(51) Int. Cl.
*B60K 1/04* (2006.01)

(52) U.S. Cl.
CPC ........ *B60K 1/04* (2013.01); *B60K 2001/0416* (2013.01); *B60Y 2306/01* (2013.01)

(58) Field of Classification Search
CPC .... B60K 2001/0411; B60K 2001/0416; B60K 2001/0488; B60K 2001/0494; B60K 1/04; B60R 16/04; B60Y 2306/01
See application file for complete search history.

(56) References Cited

U.S. PATENT DOCUMENTS

| | | | | |
|---|---|---|---|---|
| 2,091,069 A | * | 8/1937 | Girl | B60R 5/04 224/42.32 |
| 2,953,287 A | * | 9/1960 | Werner | B60R 5/04 224/42.32 |
| 3,347,501 A | * | 10/1967 | Van Eimeren | B60K 5/1241 180/232 |
| 3,627,158 A | * | 12/1971 | Kobasic | B60R 5/04 414/462 |
| 3,989,118 A | * | 11/1976 | Hansen | B60R 16/04 180/68.5 |
| 4,134,504 A | * | 1/1979 | Salas | A61G 3/06 414/522 |
| 4,251,178 A | * | 2/1981 | Bourgraf | B60R 5/04 414/343 |
| 4,252,206 A | * | 2/1981 | Burkholder | B60K 1/04 180/68.5 |
| 4,616,972 A | * | 10/1986 | McFarland | A61G 3/0209 224/496 |
| 4,685,860 A | * | 8/1987 | McFarland | A61G 3/0209 212/280 |

(Continued)

FOREIGN PATENT DOCUMENTS

FR 3003206 a1 * 9/2014

*Primary Examiner* — Hau V Phan
*Assistant Examiner* — Jacob B Meyer
(74) *Attorney, Agent, or Firm* — Jason Rogers; Brooks Kushman P.C.

(57) ABSTRACT

An electrified vehicle includes a body structure defining a support surface and a crush space adjacent the support surface. The electrified vehicle further includes a traction battery for providing power to a powertrain. The electrified vehicle further includes a battery support structure having at least one hinge mechanism secured to the traction battery and to the support surface to permit rotational movement of the traction battery relative to the support surface. The battery support structure further includes a guide rail secured to the support surface. The battery support structure further includes a slide rail disposed in engagement with the guide rail and slidable relative to the guide rail. The battery support structure further includes at least one linkage rotatably secured at a first end to the slide rail and rotatably secured at a second end to the traction battery.

18 Claims, 2 Drawing Sheets

(56) References Cited

U.S. PATENT DOCUMENTS

| | | | | |
|---|---|---|---|---|
| 4,969,793 A * | 11/1990 | Pawl | B60R 5/04 | 187/269 |
| 5,193,635 A * | 3/1993 | Mizuno | B60K 1/04 | 180/65.25 |
| 5,253,973 A * | 10/1993 | Fretwell | B60P 1/445 | 414/541 |
| 5,301,765 A * | 4/1994 | Swanson | B60K 1/04 | 104/34 |
| 5,301,992 A * | 4/1994 | Whitmore | B60R 5/04 | 224/542 |
| 5,372,216 A * | 12/1994 | Tsuji | B60G 99/00 | 180/274 |
| 5,449,218 A * | 9/1995 | Beauvais | B60N 2/4214 | 297/216.19 |
| 5,476,151 A * | 12/1995 | Tsuchida | B60K 1/00 | 180/274 |
| 5,538,386 A * | 7/1996 | Scheibel | B62B 5/0003 | 414/347 |
| 5,555,950 A * | 9/1996 | Harada | B60K 1/04 | 180/232 |
| 5,570,988 A * | 11/1996 | Gallaway | B62B 5/0003 | 414/343 |
| 5,585,205 A * | 12/1996 | Kohchi | B60K 1/04 | 180/65.1 |
| 5,760,569 A * | 6/1998 | Chase, Jr. | B60K 1/04 | 104/34 |
| 6,024,527 A * | 2/2000 | Soriano | B60R 5/04 | 254/10 R |
| 6,357,070 B1 * | 3/2002 | Venard | A47L 11/28 | 15/320 |
| 6,386,611 B1 * | 5/2002 | Buchfink | B60R 11/02 | 296/187.08 |
| 6,398,479 B1 * | 6/2002 | Dupuy | B60P 1/445 | 414/540 |
| 6,412,581 B2 * | 7/2002 | Enomoto | B60K 11/04 | 165/69 |
| 6,516,983 B2 * | 2/2003 | Sotiroff | B60J 5/047 | 224/281 |
| 6,533,525 B2 * | 3/2003 | Haid | B60P 1/003 | 14/69.5 |
| 6,709,038 B2 * | 3/2004 | Bienert | B60R 5/04 | 296/26.1 |
| 7,066,515 B2 * | 6/2006 | Pierce | B60R 19/00 | 180/68.5 |
| 7,070,015 B2 * | 7/2006 | Mathews | B60K 1/04 | 180/274 |
| 7,179,040 B2 * | 2/2007 | Masuda | B60R 5/04 | 187/211 |
| 7,401,669 B2 * | 7/2008 | Fujii | B60R 16/04 | 180/65.1 |
| 7,517,019 B2 * | 4/2009 | Ohtsubo | B60N 2/0224 | 297/341 |
| 7,670,097 B2 * | 3/2010 | Horton | B60R 5/04 | 414/462 |
| 7,690,464 B2 | 4/2010 | Yustick et al. | | |
| 7,717,207 B2 * | 5/2010 | Watanabe | B60K 1/04 | 180/274 |
| 7,913,788 B1 | 3/2011 | Bryer et al. | | |
| 7,921,951 B2 * | 4/2011 | Watanabe | B60K 1/04 | 180/68.5 |
| 7,992,912 B2 * | 8/2011 | Klotz | B60R 5/04 | 296/26.09 |
| 8,051,934 B2 * | 11/2011 | Kiya | B60K 1/04 | 180/274 |
| 8,146,976 B2 * | 4/2012 | Oliver | B60R 5/04 | 296/37.1 |
| 8,231,190 B2 * | 7/2012 | Ertz | F25D 25/025 | 312/323 |
| 8,356,687 B2 * | 1/2013 | Baumann | B60R 21/0134 | 180/232 |
| 8,453,778 B2 | 6/2013 | Bannier et al. | | |
| 8,474,928 B2 * | 7/2013 | Ertz | F25D 25/025 | 312/402 |
| 8,540,282 B2 * | 9/2013 | Yoda | B60K 1/04 | 180/232 |
| 8,573,647 B2 * | 11/2013 | Enning | B60K 1/04 | 180/232 |
| 8,602,454 B1 | 12/2013 | Baccouche et al. | | |
| 8,657,350 B2 | 2/2014 | Cabo | | |
| 8,763,740 B2 | 7/2014 | Marcath et al. | | |
| 8,858,152 B1 * | 10/2014 | McDaniel | B60S 5/06 | 414/331.02 |
| 8,876,184 B2 | 11/2014 | Lucas | | |
| 8,881,853 B2 | 11/2014 | Nitawaki | | |
| 8,905,276 B2 * | 12/2014 | Bernet | B60R 5/04 | 224/281 |
| 8,973,254 B2 * | 3/2015 | Droste | B60L 11/1877 | 29/730 |
| 9,139,074 B2 * | 9/2015 | Jarocki | B60K 1/04 | |
| 9,145,093 B1 | 9/2015 | Bard | B60R 5/04 | |
| 9,156,340 B2 * | 10/2015 | van den Akker | B60K 1/04 | |
| 9,236,592 B2 * | 1/2016 | Sundararajan | H01M 2/1077 | |
| 9,517,686 B1 * | 12/2016 | Paramasivam | B60K 1/04 | |
| 9,561,823 B2 * | 2/2017 | Eberle | B62D 21/152 | |
| 9,579,962 B2 * | 2/2017 | Kobukata | B60K 1/04 | |
| 9,718,362 B2 * | 8/2017 | Yamanaka | B60K 1/00 | |
| 9,722,223 B1 * | 8/2017 | Maguire | H01M 2/1083 | |
| 9,815,527 B2 * | 11/2017 | Robertson | B63B 23/40 | |
| 9,837,645 B2 * | 12/2017 | Katayama | H01M 2/1083 | |
| 2002/0034430 A1 * | 3/2002 | Sotiroff | B60J 5/047 | 414/462 |
| 2004/0090085 A1 * | 5/2004 | Kawasaki | B60K 1/04 | 296/187.09 |
| 2007/0205626 A1 * | 9/2007 | Ohtsubo | B60N 2/0224 | 296/75 |
| 2007/0215399 A1 * | 9/2007 | Watanabe | B60K 1/04 | 180/68.5 |
| 2008/0006459 A1 * | 1/2008 | Niebuhr | B60K 1/04 | 180/68.5 |
| 2009/0078487 A1 * | 3/2009 | Borg | B60R 21/38 | 180/274 |
| 2009/0101422 A1 * | 4/2009 | Subramanian | B60K 1/04 | 180/65.31 |
| 2009/0226806 A1 * | 9/2009 | Kiya | B60K 1/04 | 429/186 |
| 2009/0242298 A1 * | 10/2009 | Guss | B60K 1/04 | 180/68.5 |
| 2010/0101885 A1 * | 4/2010 | Nozaki | B60K 1/00 | 180/232 |
| 2010/0140887 A1 * | 6/2010 | Yehiav | B62B 5/0003 | 280/33.991 |
| 2011/0234070 A1 * | 9/2011 | Kataoka | B61C 17/00 | 312/319.1 |
| 2012/0018237 A1 * | 1/2012 | Kovach | H01M 2/1083 | 180/68.5 |
| 2013/0026786 A1 * | 1/2013 | Saeki | B60K 1/04 | 296/187.12 |
| 2013/0270862 A1 * | 10/2013 | Hotta | B62D 21/155 | 296/187.09 |
| 2014/0140797 A1 * | 5/2014 | Howe | B62B 3/027 | 414/498 |
| 2014/0242447 A1 * | 8/2014 | Nomura | B60L 11/005 | 429/163 |
| 2015/0151624 A1 * | 6/2015 | Yamada | B60K 1/04 | 180/68.5 |
| 2015/0243950 A1 * | 8/2015 | Hara | H01M 2/1077 | 429/99 |
| 2016/0001748 A1 * | 1/2016 | Moskowitz | B60K 1/04 | 701/22 |

\* cited by examiner

BATTERY SUPPORT STRUCTURE FOR ELECTRIFIED VEHICLE

TECHNICAL FIELD

This disclosure relates to a battery support structure, and more particularly, to a battery lift support structure.

BACKGROUND

Electrified vehicles, such as hybrid electric vehicles (HEVs), plug-in hybrid electric vehicles (PHEVs), battery electric vehicles (BEVs), or fuel cell vehicles differ from conventional motor vehicles in that they are powered by electric machines (i.e., electric motors and/or generators) instead of or in addition to an internal combustion engine. High voltage (HV) current for powering these types of electric machines is typically supplied by a high voltage traction battery system.

Electrified vehicle battery systems may employ one or more battery modules that include a plurality of battery arrays. Each battery array includes a plurality of battery cells that are supported relative to one another and are interconnected electrically between battery cell terminals and interconnector bus bars. The packaging of these battery arrays may benefit from structural energy management to maintain the integrity of the battery cells.

In order to maximize the vehicle's effective driving range, it is desirable to increase the number of battery cells the vehicle carries. The battery cells are typically separated into modules and installed in a location within the vehicle. In many approaches, the batteries are stored in the trunk area of the vehicle. As such, battery modules are often located adjacent to impact zones, such as the rear end or sides of a vehicle.

SUMMARY

An electrified vehicle includes a body structure defining a support surface and a crush space adjacent the support surface. The electrified vehicle further includes a traction battery for providing power to a powertrain. The electrified vehicle further includes a battery support structure having at least one hinge mechanism secured to the traction battery and to the support surface to permit rotational movement of the traction battery relative to the support surface. The battery support structure further includes a guide rail secured to the support surface. The battery support structure further includes a slide rail disposed in engagement with the guide rail and slidable relative to the guide rail. The battery support structure further includes at least one linkage rotatably secured at a first end to the slide rail and rotatably secured at a second end to the traction battery.

A vehicle battery system including a battery and a hinge connecting the battery to a support surface. The vehicle battery system further includes a battery support structure having a guide rail secured to the support surface adjacent the battery. The vehicle battery system further includes a slide rail in engagement with the guide rail and slidable relative to the guide rail. The vehicle battery system further includes a lift arm rotatably secured at a first end to the slide rail and rotatably secured at a second end to the battery.

A traction battery support structure for an electrified vehicle includes a hinge adapted to connect a traction battery to a support surface. The traction battery support structure further includes a guide rail adapted to be secured to the support surface adjacent the traction battery. The traction battery support structure further includes a slide rail adapted for slideable engagement with the guide rail. The traction battery support structure further includes a linkage rotatably secured at a first end to the slide rail and adapted to be rotatably secured at a second end to the traction battery.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
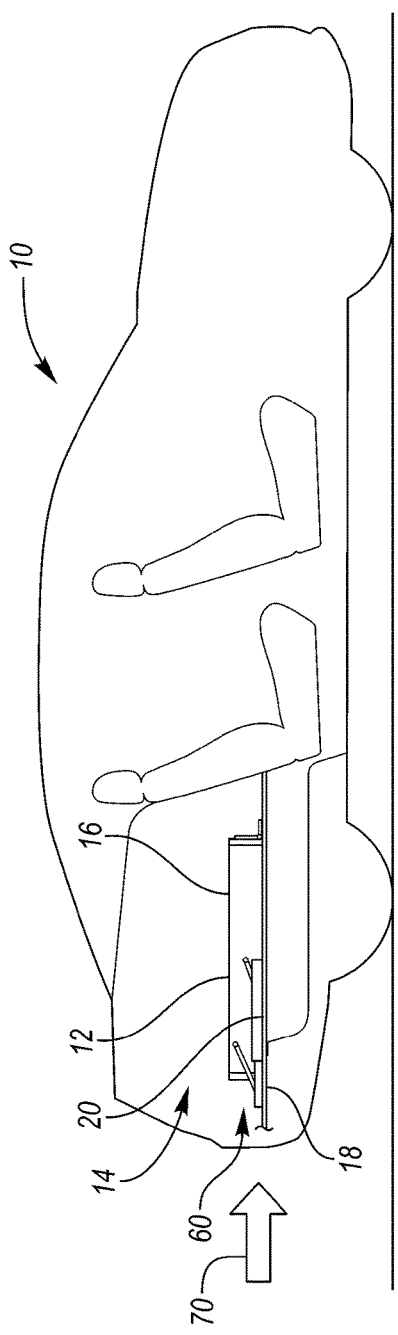
FIG. 1 is a schematic side view of a vehicle having a traction battery supported by a battery support structure in a first configuration.

Referring to FIG. 1, a vehicle 10 includes a battery 12 for providing power to a powertrain. Battery 12 may be a high voltage traction battery, or any other suitable battery. In the example of FIG. 1, a traction battery 12 is housed in a lower rear portion of the vehicle 10. More specifically, the battery 12 may be housed within a trunk compartment 14. Other battery storage locations within the vehicle are expressly contemplated, such as the fuel tank zone, tunnel area (or underbody), or underneath the seats.

Figure 2:
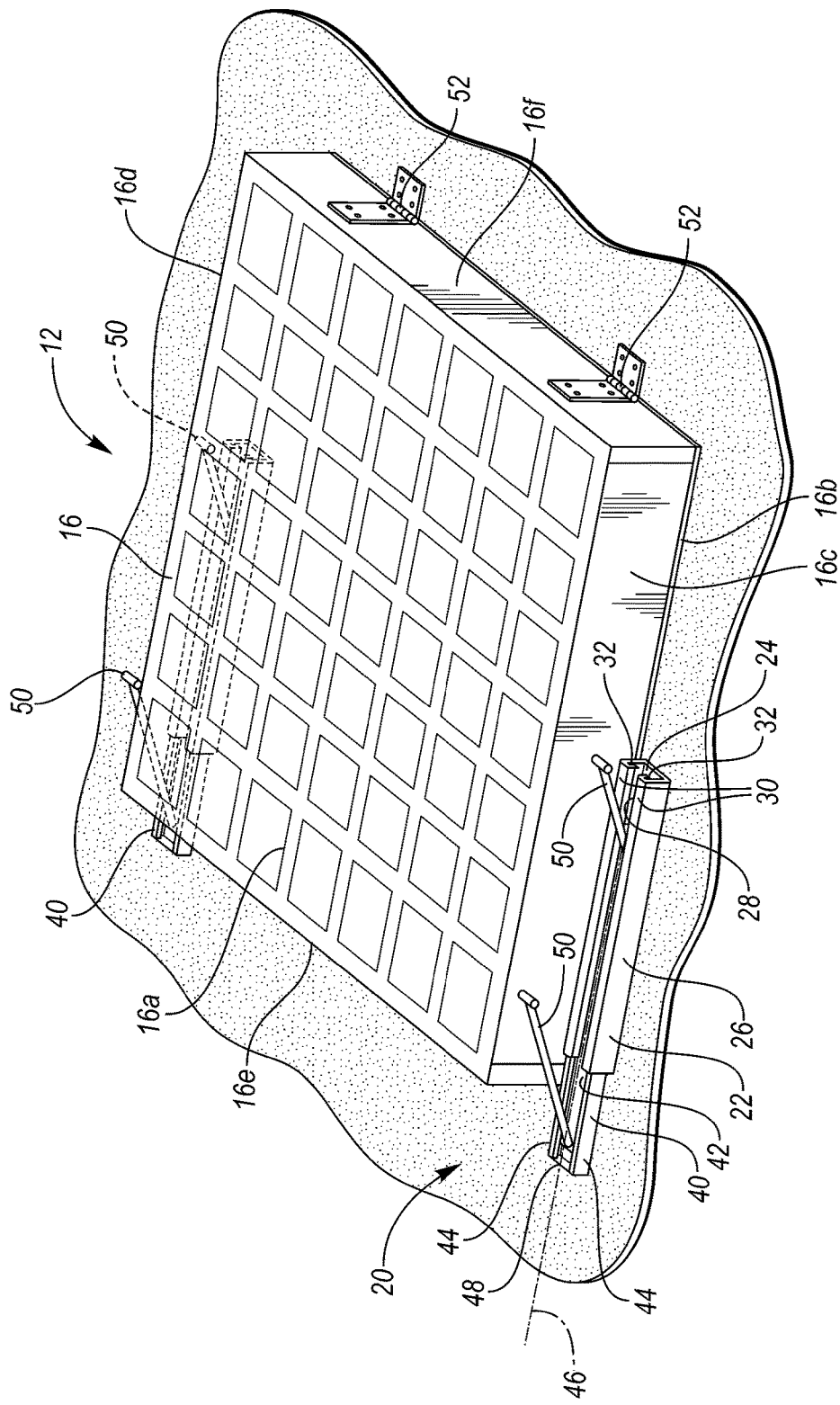
FIG. 2 is a perspective view of a battery support structure.

The traction battery 12 may include an external housing 16 to enclose a number of interconnected battery cells for storing energy and providing power to the vehicle powertrain. With reference momentarily to FIG. 2, the housing 16 may include integrally-formed or discrete peripheral components, such as a top wall 16a, a bottom wall 16b, and a plurality of side walls 16c, 16d, 16e, 16f. Two or more of the peripheral walls 16a, 16b 16c 16d, 16e, 16f may be configured to apply compression forces, or clamping loads, to the battery cells. In this way, the peripheral walls may define a compressive load path In the approach shown in FIG. 1, side wall 16e may be referred to as a rear side wall, and side wall 16f may be referred to as a forward side wall. As will be appreciated, the rear side wall 16e may define a terminal face facing a crush space 60 defined by the vehicle body structure.

The battery cells may be arranged in battery cell arrays within the housing 16. The battery cells, which may be prismatic cells, may include electrochemical cells that convert stored chemical energy to electrical energy. Prismatic cells may include a can housing, a positive electrode (cathode) and a negative electrode (anode). An electrolyte may allow ions to move between the anode and cathode during discharge, and then return during recharge. The battery cell arrays may be in electrical communication with other vehicle components (e.g., a BEC, BECM, or DC/DC converter unit). For example, terminals may allow current to flow out of the battery cells for use by the vehicle components. When positioned in an array with multiple battery cells, the terminals of each battery cell may be aligned with opposing terminals (positive and negative) adjacent to one another to facilitate a series connection between the multiple battery cells.

The number of battery cells enclosed within the housing 16 can vary based the desired power level and the types of battery cells used to store energy. In some implementations, there may be several hundred battery cells combined within the traction battery. The accumulation of a high number of cells contributes to the overall size and mass of the traction battery 12. The location of the traction battery 12 within the vehicle 10 can be controlled by the type of securement to the vehicle structure.

In the approach shown in FIG. 1, the housing 16 of the traction battery 12 is secured to a support surface 18. The traction battery 12 may be disposed in contact with the support surface 18, or may be disposed in spaced relation relative to the support surface 18. In one approach, the support surface 18 is a rear underbody portion of the vehicle body structure. In other approaches, the housing 16 of the traction battery may be secured to a floor portion of the vehicle body structure, to upright walls of the vehicle body structure, or to other components such as seats disposed within the vehicle 10.

Referring now to FIG. 2, the traction battery 12 is secured to the vehicle 10 through a battery support structure 20. The battery support structure 20 includes at least one guide rail 22, and preferably two guide rails 22 disposed on opposite sides of the traction battery 12. In still another approach, the battery support structure 20 may include one or more guides rail disposed underneath the traction battery 12. The guide rails disposed underneath the battery may be in addition to, or in place of, guide rails disposed at one or more sides of the battery. As will be appreciated, the addition of additional guide rails may reduce loads on other guide rails.

The one or more guide rails 22 may extend parallel to corresponding side walls (e.g., walls 16c, 16d) of the traction battery 12. The one or more guide rails 22 may be disposed at or near a rearward wall (e.g., wall 16e) of the traction battery 12, and may extend along a depth of the traction battery 12. In one example, the guide rails 22 may extend to an approximate midpoint of the depth of the traction battery 12. In another example, the one or more guide rails 22 may extend along an entire depth of the traction battery 12. Any suitable guide rail position and size may be utilized. Furthermore, the guide rails 22 may be formed of any suitable material, such as a metal.

The guide rails 22 may be secured to the vehicle body structure. For example, a bottom wall 24 of a guide rail 22 may be secured to a support surface 18 (e.g., an underbody portion) of the vehicle 10. In a preferred approach, the guide rails 22 are bolted to the vehicle body structure. However, the guide rails 22 may be secured to the vehicle body structure through any suitable approach, including welding, using an adhesive (e.g., hot melt glue), or using other mechanical fasteners (e.g., rivets, clips, etc.).

The guide rails 22 may include at least one, and preferably two, upright walls 26 extending from the bottom wall 24.

The upright walls 26, together with the bottom wall 24, define a primary guide channel 28. In one approach, at least one of the upright walls 26 includes a lip region 30 that defines a secondary guide channel 32.

The battery support structure 20 also includes at least one slide rail 40, and preferably two slide rails 40 disposed in engagement with the guide rails 22. Each slide rail 40 may include a bottom wall 42 and at least one, and preferably two, upright walls 44 extending from the bottom wall 42.

The slide rails 40 are preferably disposed at least partially within guide rails 22. For example, bottom surfaces of the slide rail bottom walls 42 may interface with top surfaces of the guide rail bottom walls 24. Similarly, the side walls 44 of the slide rails 40 may interface the side walls 26 of the guide rails 22. In some approaches, particularly approaches in which the guide rails 22 are bolted to the support surface 18 (e.g., the underbody) of the vehicle 10, the bottom surfaces of the slide rail bottom walls 42 may be spaced from the top surfaces of the guide rail bottom walls 24.

The interaction of the slide rails 40 and guide rails 22 is such that the slide rails 40 can slide relative to the guide rails 22. The slide rails 40 may slide, for example, along a sliding axis 46 within the primary guide channels 28 of the guide rails 22. The sliding axis 46 may generally extend in a direction corresponding to a longitudinal length of the guide rail 22.

Furthermore, the side walls 44 of the slide rails 40 may interface the lip regions 30 of the guide rails 22. In this way, upper regions of the side walls 44 are slidable within the secondary guide channels 32. For example, the secondary guide channels 32 may guide curled regions of the side walls 44 of the slide rails 40. The lip regions 30 may maintain movement of the slide rails 40 in the axial direction corresponding to the sliding axis 46, and may further restrict movement of the slide rails 40 in a vertical direction normal to the sliding axis 46.

The slide rails 40 may further include an end wall 48. The end wall 48 may engage the lip regions 30 when the slide rails 40 slide axially along the sliding axis 46, thereby acting as a "stop" to limit axially movement of the slide rails 40 relative to the guide rails 22. In another approach, the guide rails 22 include an end wall adapted to restrict axially movement of the slide rails 40 relative to the guide rails 22.

The slide rails may be disposed in engagement with the guide rails to permit movement of the slide rails relative to the guide rails. Any suitable arrangement of guide rails and slide rails may be implemented to permit such movement of slide rails relative to guide rails. For example, the above approaches describe a slide rail 40 slidable within a guide channel 32 of a guide rail 22. In another approach (not shown), a slide rail 40 may define a guide channel, and a guide rail may be disposed at least partially within the guide channel of the slide rail. In either approach, the battery support structure 20 may include a fixed component (e.g., secured to the vehicle) and a movable component (e.g., secured to the traction battery) that is movable relative to the fixed component. Other slide rail and guide rail arrangements are expressly contemplated herein.

Under normal operating conditions, movement of the slide rails 40 relative to the guide rails 22 may be inhibited. Also under normal operating conditions, the slide rails 40 may be secured to the guide rails 22 in an extended configuration. In this way, at least a portion of the slide rails 40 are disposed outside of the guide channels 32 and extend laterally from the guide rails 22. In one approach, one or more shear pins maintain the slide rails 40 in the extended position. Other approaches for securing the slide rails 40 in the extended configuration relative to the guide rails 30 include welding, using an adhesive (e.g., hot melt glue), or using other mechanical fasteners (e.g., bolts, rivets, clips, etc.). Thus, under normal operating conditions of the vehicle 10, the battery support structure 20 is configured to substantially prevent lateral displacement of the slide rails 40. In this way, the traction battery 12 may be secured in place during vehicle loads encountered while driving.

The battery support structure 20 also includes at least one and preferably two linkages 50 connecting each slide rail 40 to the traction battery 12. For example, each linkage 50 may be rotatably connected at a first end to a slide rail 40. For example, the linkage 50 may include a hinge pin to rotatably connect the first end to the slide rail 40. As depicted in FIG. 2, the linkage 50 may be rotatably connected to the bottom wall 42 of the slide rail 40. Alternatively, the linkage 50 may be rotatably connected to a side wall 44 of the slide rail 40.

Each linkage 50 may also be rotatably connected at a second end to the traction battery 12. For example, the linkage 50 may include a hinge pin to rotatably connect the second end to the traction battery 12. As depicted in FIG. 2, linkages 50 may be rotatably connected to first and second side walls 16c, 16d of the traction battery 12.

In one approach, a plurality of linkages 50 may be rotatably connected at respective first ends to a slide rail 40, and at respective second ends to the traction battery 12. In this approach, a first linkage disposed closest to the rear wall 16e may have a first length, and a second linkage disposed opposite the first linkage from the rear wall 16e may have a second length. The second length may be different than the first length, and more particularly, may be less than the first length. For example, the length of the second linkage may be approximately half the length of the first linkage. A third linkage may be disposed farther from the rear wall 16e than the first and second linkages, and may have a third length shorter than the second length.

In another approach, a plurality of linkages 50 may be rotatably connected at respective first ends to a slide rail 40, and at respective second ends to the traction battery 12. In this approach, a first linkage disposed closest to the rear wall 16e may be a telescoping linkage adapted to extend from a nested configuration to an extended configuration. A second linkage may be disposed opposite the first linkage from the rear wall 16e. The length of the second linkage may be equal to or different than the length of the first linkage when the first linkage is in the nested configuration, and may be less than the length of the first linkage when the first linkage is in the extended configuration. In this way, the first linkage may provide a lifting motion when in the nested configuration, and may be further extendable when a second lifting force (e.g., provided by the second linkage) is applied. Furthermore, the second linkage may also be a telescoping linkage adapted to extend from a nested configuration to an extended configuration. In this approach, the second linkage may provide a lifting motion when in the nested configuration, and may be further extendable when a third lifting force (e.g., provided by a third linkage) is applied.

In this way, the battery support structure may include one or more support assemblies, with each support assembly including a guide rail 22, a slide rail 40 in engagement with the guide rail 22, and at least one linkage 50 rotatably secured at one end to the slide rail 40 and rotatably secured at a second end to the traction battery 12.

The battery support structure 20 may further include one or more hinge mechanisms 52. In one approach, a single hinge 52 is provided. In another approach, a plurality of hinges 52 is provided. The hinges 52 may be adapted to pivotably secure the traction battery 12 to the vehicle 10. For example, the hinges 52 may have a first portion secured to a side wall (e.g., side wall 16f) of the traction battery 12, and a second portion secured to a support surface 18 of the vehicle body structure. A hinge pin may be provided to secure the first portion to the second portion and to permit the first portion to rotate about the second portion. In this way, as will be appreciated, the battery support structure 20 may be adapted to rotate the traction battery 12 between a rest position and a raised position. Rotation may occur, for example, about a hinge axis defined by the hinge pin.

In a rest position (e.g., during normal operating conditions), a portion of the slide rails 40 extends out of the primary guide channel 28 of the guide rail 30 and beyond a terminal face (e.g., forward wall 16e) of the traction battery 12 and into the crush space 60 defined by the vehicle body structure. With reference momentarily to FIG. 1, the portion of the slide rail 40 preferably extends into a crush space or area 60 at the rear portion of the vehicle 10. Crush area 60 generally extends laterally across the track width of the vehicle 10 and axially from the rear bumper to the vicinity of rear seat.

Thus, the rest position may define a first configuration. In the first configuration, the slide rails 40 may be disposed in an extended position (for example, as shown in FIG. 1). In the extended position, an end portion of the slide rail 40 may be extended such that it is spaced a first distance from an end portion of the guide rail 22. Also in the first configuration, the linkage 50 defines a first angular orientation with respect to the guide rail 22 and/or the slide rail 40. Also in the first configuration, the traction battery 12 defines a first angular orientation with respect to the support surface 18.

In the event of a vehicle impact, horizontal loads from external sources can be significantly higher compared to the loads encountered during normal vehicle operating conditions. The increase in loads can cause deformation of various portions of the vehicle structure. Intrusion into structure of the passenger cabin, engine compartment, and/or rear storage compartment is caused by the vehicle impact. Relative to intrusion into the compartment that holds the traction battery 12, it may be desirable to displace the traction battery 12 to reduce the risk of intrusion into the housing 16 caused by the vehicle impact.

Arrow 70 in FIG. 1 generally represents a direction of an external load upon the vehicle 10 due to an impact. In this example, a rear impact is depicted; however, vehicle impact loads from various directions may be mitigated by a battery support structure 20 according to the present disclosure. Because the traction battery 12 may be stored in portion of the vehicle structure such as a middle portion or forward portion, a battery support structure 20 according to the present disclosure can operate to mitigate external impact loads applied to each of the respective locations of a battery mounting.

Figure 3:
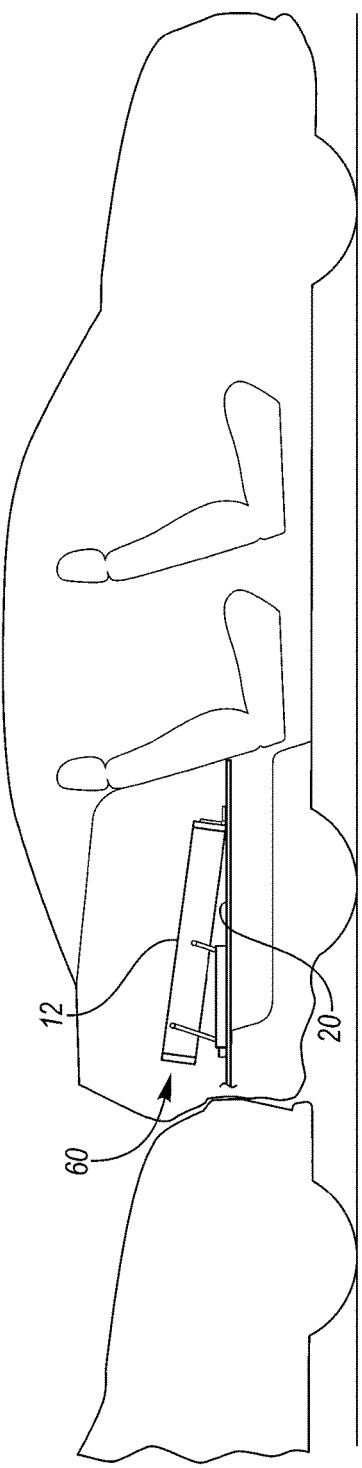
FIG. 3 is a schematic side view of a vehicle having a traction battery supported by a battery support structure in a second configuration.

During a vehicle impact event, such as the impact event shown in FIG. 3, the vehicle structure may deform into a crush zone area 60. Depending on the magnitude of the external load, the vehicle structure may be driven into contact with the extended slide rails 40 such that the slide rails 40 are loaded with impact forces. In one approach, the fastener or fasteners securing the slide rails 40 to the guide rails 30 shear upon receiving a predetermined impact force. Lateral forces applied to the slide rails 40 cause the slide rails to be driven along the sliding axis 46 within the primary guide channels 28 of the guide rails 22.

Thus, the impact position may define a second configuration. In the second configuration, the slide rails 40 may be disposed in a retracted position. In the retracted position, the end portion of the slide rail 40 is moved closer to the end portion of the guide rail 22 such that the end portion of the slide rail 40 is spaced a second distance from the end portion of the guide rail 22 that is less than the first distance described with respect to the first configuration. Also in the second configuration, the linkage 50 defines a second angular orientation with respect to the guide rail 22 and/or the slide rail 40 that is different than the first angular configuration described with respect to the first configuration. Also in the second configuration, the traction battery defines a second angular orientation with respect to the support surface that is different than the first angular orientation described with respect to the first configuration.

Axial movement of the slide rails 40 causes the linkages 50 to pivot about respective linkage attachment axes, thereby causing the impact-facing portion of the traction battery 12 to be driven upward and away from the guide rails 30. In this way, the linkages are rotated from a first angular orientation (for example, as shown in FIG. 1) to a second angularly orientation (for example, as shown in FIG. 3). As such, the linkages 50 may perform as lift arms.

As discussed, a portion of the traction battery 12 opposite the impact-facing portion is secured to the vehicle body at hinges 52. In this way, during impact, the configuration of the guide rails 22, the slide rails 40, and the linkages 50 causes the traction battery 12 to rotate about the hinges 52. The traction battery 12 may be rotated between 1 degree and 90 degrees about the hinges 52. In one approach, the traction battery 12 is rotated between 15 degrees and 45 degrees about the hinges 52.

In still another approach (not shown), the vehicle 10 may be provided with one or more impact sensors adapted to detect an actual or impending collision event. The battery support structure 20 may further be provided with one or more actuators secured to the vehicle body and to the traction battery 12. Upon detection of a collision event, the one or more actuators may drive traction battery 12 generally upward to rotate the traction battery 12 about the hinge mechanisms 52.

Rotation of the traction battery 12 about the hinges 52 moves the impact-facing portion (e.g., side wall 16*e*) of the traction battery 12 away from the crush area 60. In this way, the vehicle 10 (e.g., at crush area 60) may experience increased deformation before the deformation impacts the traction battery 12.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An electrified vehicle comprising:
   a body structure defining a support surface and a crush space adjacent the support surface;
   a traction battery for providing power to a powertrain; and
   a battery support structure having
      at least one hinge mechanism secured to the traction battery and to the support surface to permit rotational movement of the traction battery relative to the support surface,
      a guide rail secured to the support surface,
      a slide rail disposed in engagement with the guide rail and slidable relative to the guide rail, and
      at least one linkage rotatably secured at a first end to the slide rail and rotatably secured at a second end to the traction battery;
      wherein in a first configuration, the slide rail extends along a side wall of the traction battery, beyond a terminal face of the traction battery, and into the crush space, and wherein in the first configuration, movement of the slide rail relative to the guide rail is inhibited by a shear pin.

2. The electrified vehicle of claim 1, wherein in response to the slide rail receiving a load, the slide rail is adapted to shear the shear pin and to slide relative to the guide rail to a second configuration.

3. The electrified vehicle of claim 2, wherein in response to the slide rail receiving a load, the slide rail and the at least one linkage are adapted to rotate the traction battery about the hinge mechanism relative to the support surface.

4. The electrified vehicle of claim 1, wherein the guide rail, the slide rail, and the at least one linkage form a first support assembly disposed at a first side wall of the traction battery, and wherein the battery support structure further includes a second support assembly disposed at a second side wall of the traction battery opposite the first side wall, the second support assembly including a second guide rail secured to the support surface, a second slide rail disposed in engagement with the second guide rail and slidable relative to the second guide rail, and at least one second linkage rotatably secured at a first end to the second slide rail and rotatably secured at a second end to the traction battery.

5. A vehicle battery system, comprising:
   a battery;
   a hinge connecting the battery to a support surface; and
   a battery support structure having
      a guide rail secured to the support surface adjacent the battery,
      a slide engaged with and slidable relative to the guide rail, a shear pin inhibiting sliding of the slide rail in a first configuration, and
      a lift arm rotatably secured at opposing ends to the slide rail and to the battery.

6. The vehicle battery system of claim 5, wherein in a first configuration, an end portion of the slide rail is spaced a first distance from an end portion of the guide rail, and the battery defines a first angular orientation with respect to the support surface.

7. The vehicle battery system of claim 6, wherein the slide rail is adapted to slide axially relative to the guide rail to a second configuration, and wherein in the second configuration, the end portion of the slide rail is spaced a second distance from the end portion of the guide rail, the second distance less than the first distance, and the battery defines a second angular orientation with respect to the support surface, the second angular orientation different than the first angular orientation.

8. The vehicle battery system of claim 7, wherein in the second configuration, the lift arm and the hinge support the battery in the second angular orientation.

9. The vehicle battery system of claim 5, wherein in the battery support structure is a first battery support structure, the battery support structure further comprising a second battery support structure disposed at an opposite side of the battery from the first battery support structure, the second battery support structure including a second guide rail secured to the support surface adjacent the battery, a second slide rail in engagement with the second guide rail and slidable relative to the second guide rail, and a second lift arm rotatably secured at a first end to the slide rail and rotatably secured at a second end to the battery.

10. A traction battery support structure for an electrified vehicle, comprising:

a hinge adapted to connect a traction battery to a support surface;

a guide rail adapted to be secured to the support surface adjacent the traction battery;

a slide rail adapted for slideable engagement with the guide rail;

a fastener adapted to rigidly secure the slide rail to the guide rail in a first configuration, wherein in the first configuration, the slide rail extends along a side wall of the traction battery, beyond a terminal face of the traction battery, and into the crush space, and a linkage rotatably secured at a first end to the slide rail and adapted to be rotatably secured at a second end to the traction battery.

11. The traction battery support structure of claim 10, wherein the guide rail defines a channel, and wherein at least a portion of the slide rail is slidable within the channel.

12. The traction battery support structure of claim 10, wherein the linkage is a first linkage, and wherein the traction battery support structure further comprises a second linkage spaced from the first linkage and rotatably secured at a first end to the slide rail and adapted to be rotatably secured at a second end to the traction battery.

13. The traction battery support structure of claim 12, wherein the first linkage defines a first length, wherein the second linkage defines a second length less than the first length.

14. The traction battery support structure of claim 13, wherein the first linkage is a telescoping linkage having an extendable length extendable from the first length to an extended length.

15. The traction battery support structure of claim 10, wherein the slide rail includes an end wall adapted to restrict axial movement of the slide rail relative to the guide rail.

16. The traction battery support structure of claim 10, wherein axial movement of the slide rail relative to the guide rail moves the linkage from a first angular orientation relative to the guide rail to a second angular orientation relative to the guide rail.

17. The traction battery support structure of claim 10, wherein the slide rail is secured to the guide rail to inhibit movement of the slide rail relative to the guide rail in a first configuration, and wherein an end portion of the slide rail is spaced a first distance from an end portion of the guide rail in the first configuration.

18. The traction battery support structure of claim 17, wherein the slide rail is adapted to slide axially relative to the guide rail to a second configuration, and wherein the end portion of the slide rail is spaced a second distance from the end portion of the guide rail in the second configuration, the second distance less than the first distance.

* * * * *